Feb. 22, 1949.  S. LIPSON ET AL  2,462,113

WAX INJECTION APPARATUS

Filed Jan. 11, 1946  2 Sheets-Sheet 1

Inventors,
Samuel Lipson
Hyman Rosenthal
Harold Markus

By J. H. Church & H. E. Thibodeau
Attorneys

Feb. 22, 1949.  S. LIPSON ET AL  2,462,113
WAX INJECTION APPARATUS
Filed Jan. 11, 1946  2 Sheets-Sheet 2
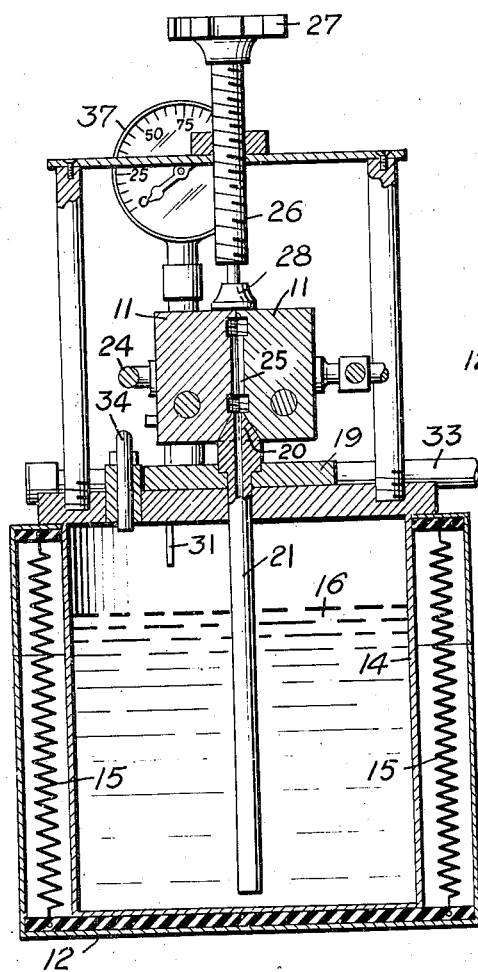
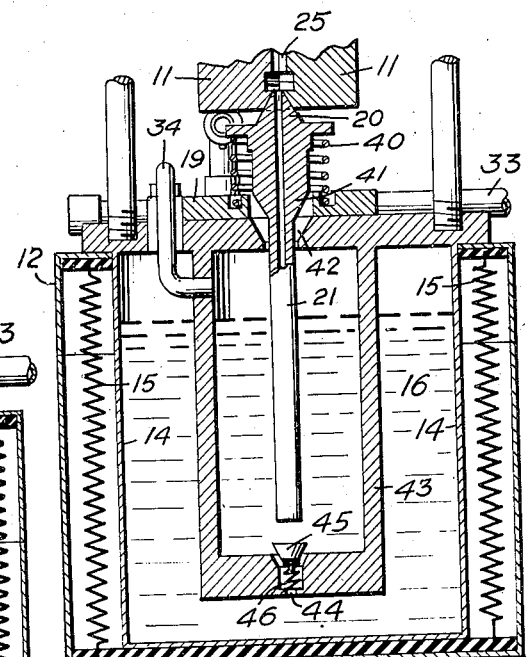
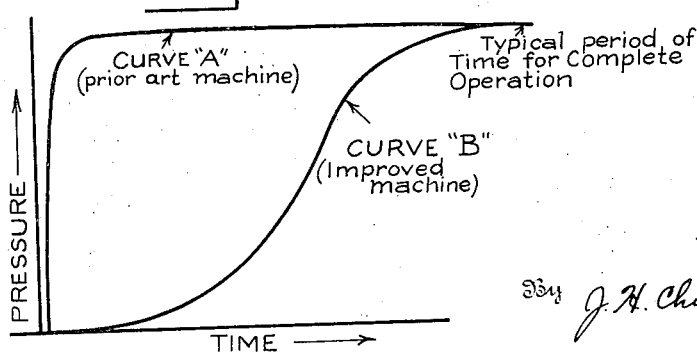
Inventors,
Samuel Lipson
Hyman Rosenthal
Harold Markus
By J. H. Church & H. E. Thibodeau
Attorneys

Patented Feb. 22, 1949

2,462,113

UNITED STATES PATENT OFFICE 2,462,113

WAX INJECTION APPARATUS

Samuel Lipson, Hyman Rosenthal, and Harold Markus, Philadelphia, Pa.

Application January 11, 1946, Serial No. 640,629

2 Claims. (Cl. 18—30)

(Granted under the act of March 3, 1883, as amended April 30, 1928; 370 O. G. 757)

The invention described herein may be manufactured and used by or for the Government for governmental purposes without the payment to us of any royalty thereon.

Our invention relates to the precision casting of metals by the well known "lost wax investment process," and it has special reference to wax injection equipment applicable to the production of wax models used in that process.

Broadly stated, the object of our invention is to provide a simple, inexpensive injection type wax model-making machine which is capable of more efficient and easier operation than any of its predecessors in the art.

A more specific object is to provide apparatus for producing wax models that are free from surface defects.

Another object is to avoid air entrapment and turbulence in the molten wax during formation of those models.

A further object is to enable the manufacture of models for precision casting from liquid wax.

An additional object is to decrease the skill and effort that is required of the machine operators.

In practicing our invention we attain the foregoing and other objects by providing a wax injection machine of unique construction and superior performance. Preferred and alternate forms of such a machine are shown by the accompanying drawings wherein:

Fig. 2 is a vertical section taken along lines 2—2 of Fig. 1 and looking in the direction of the arrows.

Fig. 3 is a similar view of a modified construction of a wax injection machine.

Figure 1:
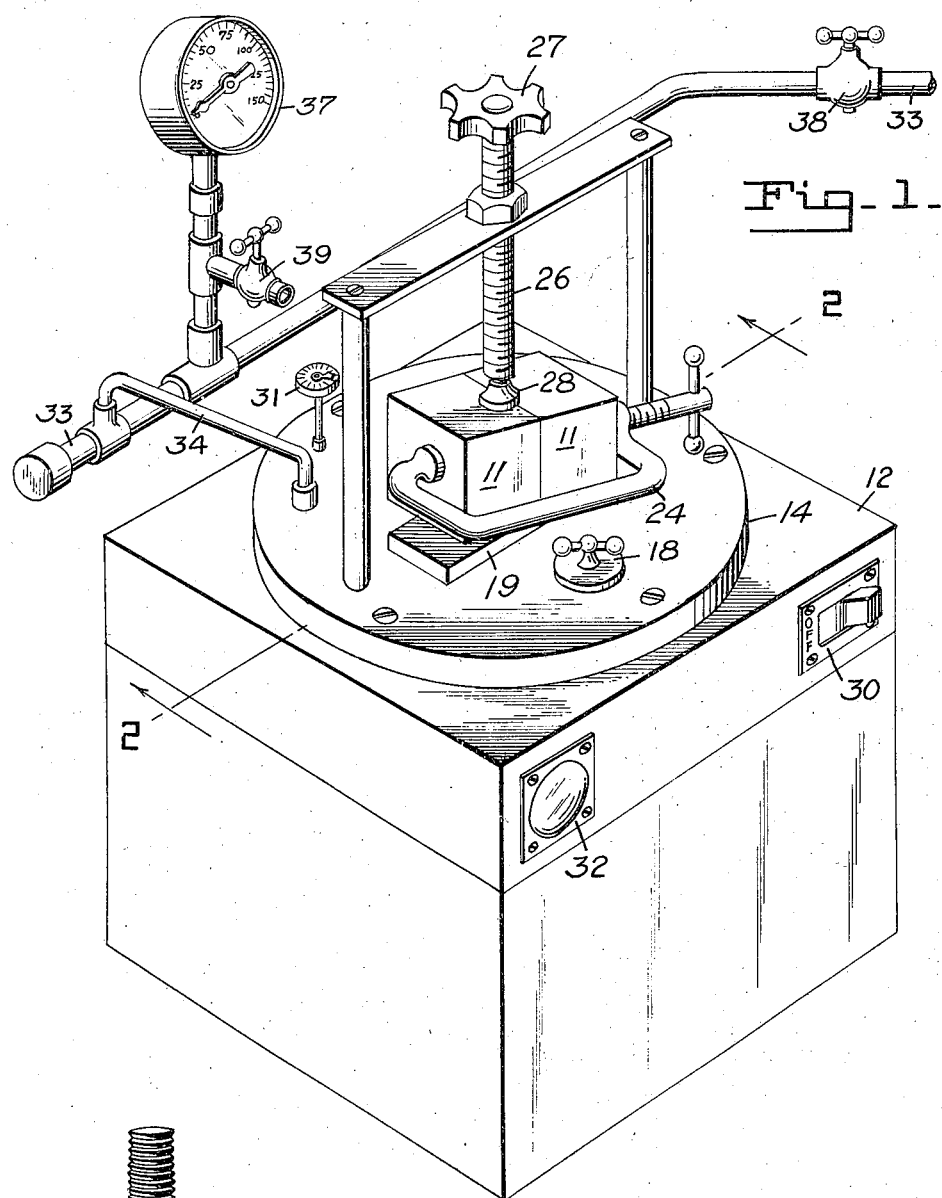
Fig. 1 is a perspective view of a wax injection machine embodying our invention.
Figure 5:
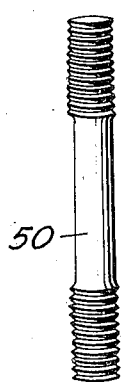

Fig. 4 graphically illustrates the difference in pressure-time curves between machines of the prior art and machines of our new design; and Fig. 5 depicts a sample wax model in the form of a tensile test specimen which can be made by the machines of Figs. 1-2-3.

Need for improved precision casting techniques

For the purpose of reducing or eliminating the need for many delicate machining operations in manufacturing intricately designed objects, numerous methods have been evolved by which a molten metal is cast in a patterned mold to obtain a desired form. Of these available methods, the predominant techniques employed by workers in this field have been distributed among three types of casting—precision, die and sand.

Each of the three named methods possesses certain features not to be identified with the others. One of the reasons why precision casting has found favor is because it offers a far greater latitude of casting conditions, thereby making possible the attainment of a wide variety of desired mechanical properties in the resultant product.

Precision casting involves a number of steps of which the most important one for obtaining flawless products is the making of a wax model of the desired object. Our invention is concerned with the improvement of the equipment by which such models may be made. For an understanding of the relationship which the wax model-making step has to the remainder of the precision casting process, a brief explanation of the complete procedure will now be given.

The broad method of precision casting is itself old; a detailed description of one conventional form thereof can be found in U. S. Patent 2,118,-468 to Jungerson dated May 24, 1938 and entitled "Method of casting articles of intricate design and a product thereof." This conventional process can be conveniently divided into six phases: (1) A "negative" pattern or mold of the machine part or other object which is to be reproduced in large number is carefully made by an individual machining operation or making a metal cast thereof; (2) wax is cast into the pattern of the mold; (3) one or more of the thus formed wax patterns or "models" are fastened into an assembly provided with sprues; (4) a plaster or other investment is poured around the assembly of wax models, and the investment is permitted to harden and form a ceramic refractory mold; and (5) the desired alloy is cast into the mold cavity previously occupied by the wax to thus obtain replicas of the object intended to be reproduced. The replacement of the wax by the plaster investment is responsible for the name "lost wax investment process" which has been applied to this technique.

One important advantage of precision casting resides in the opportunity given for controlling the temperature of the just described investment step. With most other types of casting the operation must be carried out under extreme conditions. For instance, die and permanent mold casting require sudden chilling, while sand casts are slow-cooled.

Another example of the benefits to be derived in using the precision casting method is the fact that the plaster or other type investment can be rapidly decrepitated when plunged into water. This permits the castings to be quenched under controlled conditions of time and temperature. Such quench control plus regulation of the investment temperature makes it possible to obtain a wide range of the earlier mentioned desired mechanical properties.

Despite the described advantages of the precision casting method, its full development and employment have been inhibited by the comparatively high prices of available equipment for making wax models used in that method (as previously outlined), and/or inherent defects in the products obtained thereby. It is to obtain these advantages that those skilled in the art have long sought to devise an apparatus which will improve precision casting techniques by producing wax models from which the castings of a desired high quality may ultimately be made.

*Problem to be solved*

Among the various types of prior art equipment for making wax models by the "mold-injection" method, the most reasonably priced and simplest to use apparatus depends on air pressure for its operation. In using such prior art devices (not here shown), the entire system is maintained, both before and throughout the injection model forming process, under the maximum pressure necessary to disperse the wax throughout the mold.

The procedure is to melt the wax in an electrically or otherwise heated container having a valve controlled opening in its base against the under surface of which is firmly fixed a split-half forming mold. At the proper point of wax fluidity the valve is opened to admit molten material into the mold, the maximum permissible pressure being instantly exerted within the mold and sustained throughout the entire time the model is being formed and hardened.

If the wax is permitted to become too liquid in character, this sudden introduction of the system's full pressure causes the hot wax melt to become extremely turbid. As a result, air bubbles are entrapped and the finished wax model suffers numerous defects caused by a lack of homogeneity. This condition becomes increasingly aggravated as the size of the mold cavity is increased as when larger objects are cast.

The elimination of this turbulence and its resultant detrimental effect upon the wax models has been the greatest obstacle to widespread adoption of the otherwise completely satisfactory air pressure-operated apparatus. In fact, until the invention of our improved equipment, sacrifices in economy and ease of operation have had to be made in some instances because only highly expensive and complicated mechanisms could accomplish the desired results. That our improved device has achieved the sought for advantages will become evident from the following description and references to the accompanying illustrations.

*Our improved machine*

Reference to Fig. 1 will show our improved machine with a split-half forming mold 11 in position preparatory to injecting wax therein. The forming mold may preferably be made by carefully machining the desired object in a "negative" form. Another type is made by casting a soft, low-melting alloy around a "master" pattern in such way as to form separable halves. One example of a product obtained by our apparatus and process is illustrated by the wax specimen 50 shown in Fig. 5.

Our improved device itself comprises an outer case or housing 12 enclosing a cylindrical container 14 for the wax 16, surrounded by electrical heating elements (not shown in Fig. 1) represented at 15 in Figs. 2–3. A removable screw cap 18 permits chunks of wax to be easily introduced into the container 14.

Across the top of container 14 is a supporting platform 19 on which the split mold 11 rests. A nozzle 20, with its outer opening on the upper face of platform 19, is connected with a long tube 21 which extends downward almost to the bottom of the container (see Figs. 2–3).

The split-half forming mold 11 is firmly pressed together by a conventional C-clamp 24, the assembly being placed in the Fig. 1 position so that the central channel 25 of the mold pattern is aligned directly over nozzle 20 (as in Figs. 2–3). Once so positioned, the pressure screw 26 is tightened by turning its handle 27 so that its lowermost flared base portion 28 is brought to bear on the mold as shown in Fig. 1. Thus fixed in place, the mold is able to resist the pressure which forces the wax upward therein, and remain unmoved against the supporting platform 19 and nozzle 20 throughout the entire operation.

Electric current for heating the apparatus may be turned on by means of the toggle switch 30 in order to melt the wax 16 in the container 14. By determining the temperature at which a desired fluidity is attained in the case of a particular wax, the same conditions may be repeated by taking readings on a thermometer 31 (see Fig. 1) which extends into the container 14. This step can optionally be made completely automatic by installing and regulating a thermostatic switch control (not shown). A further convenience may be provided in the form of a reflector 32 covered electric light bulb which may be connected with electric switch 30 so as to signal when the current is turned on, or in thermostatically controlled modifications may serve as a beacon to indicate whether or not a desired temperature has been reached.

Air pressure is supplied to a main conduit 33 from a suitable compressor source (not shown), then through a flexible copper tubing or other pipe 34 connected to the wax container 14. An air pressure indicating gage 37 may be connected to the main conduit 33 as shown in Fig. 1, if desired.

While retaining the main principle and spirit of our invention, it is of course possible to make numerous modifications of our machine. An example of this may be had by comparing the elementary Fig. 2 machine with that of Fig. 3. The former employs a bleeder valve 39 by which air can be released from the system at the end of the model forming operation thereby permitting removal of the mold.

The modified design of Fig. 3, however, provides for an entirely automatic bleeder valve closing and opening, increasing the ease by which the apparatus may be used. As schematically shown, the mold 11 may be brought to bear upon the mouth of nozzle 20 which is pressed downwardly against compression spring 40 until the nozzle's valve-like base 41 is snugly seated in the mating opening 42 in the top of container 14.

This Fig. 3 design has certain other refinements which will be briefly mentioned here but described in detail later. The principal feature is an arrangement whereby the main wax reservoir is relieved from excessive pressure. This involves the inclusion within container 14 of a chamber 43 having an opening 44 in its base regulated by a valve 45 normally held in open position by a spring 46.

*Operation of our improved machine*

Reference to the drawings will illustrate the simplicity of making wax models by our unique machine. To operate the device, screw cap 18 is first removed and a charge of wax selected from a number of available proprietary formulations is introduced into container 14. The electric current is then turned on by means of switch 30, and the wax 16 in container 14 is melted.

Next, the air control valve 38 is adjusted to permit the correct flow of air. This flow is dependent upon the size and form of the model being molded. Once so regulated, the setting of this flow control valve need not be changed unless a different type mold is to be injected with wax.

The split-half mold 11 is then established in the position shown in Fig. 1, as previously described, and the bleeder valve 39 is closed. Immediately, air enters into container 14 (see Fig. 2) causing the pressure in the system to rise and force the molten wax through the injection tube 21 into the mold. The amount of air pressure employed is not critical, and higher or lower pressures may be utilized depending on the complexities of a particular mold into which wax is to be injected. The only requirement is the pressures be kept uniform in making a number of wax models with the same mold. In the actual tests of our apparatus the maximum pressures employed, as registered on gage 37, was varied between 25–150 pounds per square inch.

During this early part of the process there is no appreciable rise in pressure. When the mold is completely filled with wax, the pressure in the system gradually rises until equilibrium it attained with the pressure in air line 33. The curve "B" in Fig. 4 shows a typical pressure-time relationship involved in making wax models by our machine. Although the basic form of this curve "B" is retained at all settings of the flow control valve 38, the curve may be altered as desired by adjustments to that valve. A limited flow of the air would tend to produce a flatter time-pressure curve, whereas an increased air flow would produce a more rapid rise in pressure.

After the mold has been filled and sufficient time elapsed for the pressure to rise and solidification of the wax to take place, the bleeder valve 39 is opened to release air from the system and permit removal of the mold. The split halves of the mold 11 are separated and the wax model is lifted out. An example of the clean-cut, faithfully reproduced products which can be thus produced is shown by the wax tensile test bar 50 of Fig. 5, made from split molds of the type illustrated in the drawings.

*Operation of modified machine of Fig. 3*

The modified Fig. 3 apparatus, whose parts were earlier described, eliminates the need for a manually controlled bleeder (such as shown at 39 in Figs. 1–2). Otherwise, this mechanism is essentially the same in principle as the simpler machine just discussed. In operation, the mold 11 is tightened in position, as in the basic mechanism, against nozzle 20 which in turn compresses spring 40 until the valve-like tapered surface 41 is seated in and seals opening 42. The flow control valve 38, having previously been adjusted to the proper setting, air flows from the main line 33 through tube 34 into the inner chamber 43.

Introduction of air pressure into chamber 43 causes the valve 45 to close off opening 44, and simultaneously the wax rises through injection tube 21 and nozzle 20 to finally enter into mold 11. Here again the pressure-time characteristic is similar to that of Figs. 1–2 (see curve "B" in Fig. 4). The pressure in the system gradually rises when the mold is completely filled until equilibrium is attained with the pressure in the main line 33.

When the operation is finished, the downward pressure against spring 40 is gradually released. This automatically opens bleeder valve 41, thus permitting the air in the inner chamber to escape. The gradual release of the pressure against spring 40 is necessary in order that sufficient time may elapse for the air pressure in chamber 43 to fall to zero before contact between the nozzle 20 and the mold 11 is interrupted. This precaution should be observed to prevent residual air pressure in the system from causing wax to issue from the nozzle after the mold has been removed therefrom.

When this seal between valve 41 and opening 42 is broken, the release of air from inner chamber 43 relieves the pressure from valve 45 which is therefore caused to open by expansion of compression spring 46. Immediately the wax in the main container 14 flows up through opening 44 into the central chamber 43 to replace that which was forced up into the mold, reestablishing the equilibrium level between the molten liquids in the two sections. The central chamber 43 thus replenished, the apparatus is now ready for another wax injection cycle.

*Advantages of our machine over prior art*

As will now have become evident, turbulence in the molten wax and entrapment of air in the model 50 being formed in mold 11 is avoided by our mechanism. In the simplified apparatus of Figs. 1–2 or the alternate Fig. 3 design the pressure of air entering the apparatus is exerted downward on the volume of molten wax 16 to force it upon the injection tube 21 and through nozzle 20 into mold 11. Any air that is ahead of the wax is gradually pushed up through the split half mold and out through the narrow slits at the joint of the two halves, practically the entire filling of the mold taking place under relatively low pressure. The only caution to be observed in admitting air slowly in accordance with our invention is to guard against causing premature freezing or rippling defects in the wax surface which occur when the air enters too slowly.

This process makes possible the attainment of a homogeneous, defect-free wax model, one form of which is represented in Fig. 5 as a tensile test specimen 50 for illustrative purposes. The earlier described prior art air pressure operated machines, however, force wax down from a heated container (not here shown) into a mold. The molten wax drops to the bottom and rises in the mold, the pouring melt continuing to fall into the filling fluid, causing turbulence and entrapping air therein. All the air fails to get out of the mold because the dense falling liquid, carrying air with it and penetrating down through the rising wax fluid, prevents the air from escaping before the mold is entirely filled. The result is a wax model replete with air spaces, and not very satisfactory for casting objects therefrom.

The just mentioned prior art mechanism's faults may be described in another way, although the end result is the same. The downward air stream striking the wax solution already in the mold under the force of the system's maximum pressure is responsible for making the wax turbulent. As Fig. 4 shows, the extreme pressure is exerted almost instantly with the old type device. On the other hand, as that view's graph also shows, our apparatus permits opportunity for the air to be eliminated, maximum pressure being exerted only near the end of the operation cycle after all the air has been removed. This is due to the fact that the original volume of the container and mold is fixed and, as the air in the mold is gradually displaced by wax under pressure, the pressure within the continuous container-mold system is caused to rise until it equals the pressure of the compressed air line. Such final "high pressure" treatment avoids defects in the mold by causing rising wax to "feed" (i. e., compensate for) the solidification-caused shrinkage of the wax model being formed.

In the described prior art apparatus the one positive method of avoiding air entrapment is to maintain the wax in a relatively plastic state. This condition enables the material to fill the mold without successive amounts falling to the mold's bottom and carrying air therewith to be entrapped therein. Elimination of turbulence in the wax can thus be achieved, but demands close temperature control over the melting wax. This plastic state can be maintained only within a narrow temperature range which limits the utility of the method and apparatus because it increases the control necessary for the operation.

Our improved apparatus requires no such careful regulation of its operative conditions. Its low pressure "bottom-filling" technique is eminently suitable to the employment of wax fluid of low viscosity without the air pressure causing undesirable turbulence. As a result, the process can be conducted over a relatively wide temperature range, diminishing the amount of control which must be exercised.

Despite the fact that the wax may thus be utilized in a rather liquid state, and even though our device requires slow, gradually increasing application of pressure, the total time of the actual injection process is practically identical with the most rapid of comparable prior art machines as comparison of curves "A" and "B" in Fig. 4 will show.

For the production scale usages, the alternate Fig. 3 design offers an additional advantage. Since only the relatively small inner wax chamber 43 needs to be filled before the pressure starts to rise, that chamber alone needs to be so durably constructed as to be capable of withstanding the air pressure exerted thereon. This permits the larger wax container 14 to be made of relatively light materials. Such conservation of weight and materials makes our machine commercially attractive because of its comparative portability plus low cost, in addition to the fact that superior wax models for precision casting can be made therewith.

Summary

The foregoing description has shown the manner in which our improved wax injecting machine has contributed to the advancement of the precision casting art.

It will now therefore be apparent that we have provided a simple, inexpensive injection type wax model making machine which is capable of more efficient and easier operation than any of its predecessors in the art; that our apparatus will produce wax models that are free from surface defects; that our apparatus avoids air entrapment and turbulence in the molten wax during formation of the models; that we have enabled the manufacture of models for precision casting from liquid wax; and that we have decreased the skill and effort required of the machine operators.

As earlier brought out, our machine may be modified in many ways without departing from the spirit and intent of our invention. Our inventive improvements are therefore extensive in their adaption and are not to be restricted to the specific form here disclosed by way of illustration.

We claim:

1. In an injection apparatus for making models of an object to be precision cast, the combination of a substantially closed container having a bottom, side walls and top and further having in the container top an opening which normally is open to the outside atmosphere, means for charging said container with a quantity of a suitable casting material, heating means in proximity to said container for melting said casting material, a valve seat in the uppermost portion of the opening in said container's top, a valve comprised of an upper nozzle-like body portion which protrudes above and mates with said valve seat and of a lower stem portion which extends from the body portion down through the container's top to a point beneath the level of said casting material therein, said valve having a channel which axially extends entirely therethrough from the uppermost end of the body portion to the lowermost end of the stem portion, a valve seat which forms the uppermost end of the said container top opening and which coacts with said valve's body portion to close and seal said opening whenever downward pressure is applied to said valve, a mold cavitied with the desired object pattern and having a cavity inlet at the mold bottom, means for connecting said inlet with said valve's nozzle portion and for exerting downward pressure to force the valve to mate with said valve seat and close the said container top opening, and means thereafter effective for introducing gas under pressure into the interior of said container whereby to force said molten casting material upwardly through said valve's stem and body portions and into said mold cavity and thereby fill same from the bottom in a way which expels all cavity air from the mold ahead of the rising casting material.

2. In an injection apparatus for making models of an object to be precision cast, the combination of a closed outer container having a bottom, sidewalls and top, a closed pressure resistant inner chamber having a bottom, side walls and top suspended by its top from the top of said outer container, the said container and chamber tops having a common opening therethrough which normally is open to the outside atmosphere, means for charging said outer container with a suitable casting material, heating means in proximity to said outer chamber for melting said casting material, a first valve and mating first valve seat in the bottom of said inner chamber which valve is open when the chamber's internal pressure is atmospheric or below them to admit said melted casting material from the outer container into the inner chamber but which automatically closes when said chamber pressure is raised above atmospheric then to block reverse flow of casting material through said first valve out of the chamber, a second valve seat which forms the uppermost end of the opening that extends through the tops of said container and said chamber and is normally opened to the outside atmosphere, a second valve comprised of an upper nozzle-like body portion whose lowermost surface protrudes above and mates with said second valve seat in gas-tight relationship and of a lower stem portion which extends from the body portion down through the inner chamber's top to a point beneath the level of said casting material therein, said valve having a channel which axially extends entirely therethrough from the uppermost end of the body portion to the lowermost end of the stem portion, resilient means interposed between said second valve's body portion and the top of said outer container serving constantly to urge the valve body upwards so as automatically to unseat the valve from its gas-tight relationship with said second valve seat when there is released therefrom any downward pressure thereon greater than the upward pressure exerted by said resilient means thereby to allow exit of gas from the said inner chamber to equalize the pressure therein with that of the outside atmosphere and prevent casting material from rising in the said second valve's stem portion, a mold cavitied with the desired object pattern having a cavity inlet at the mold bottom, means for connecting said inlet with the uppermost end of said second valve's nozzle-like body portion whereby to exert upon that valve downward pressure for overcoming the resistance of said resilient means and effecting closure of that valve in coaction with said second valve seat, and means for introducing gas under pressure through the common opening in the chamber and container tops into the interior of said inner chamber whereby to force the closure of said first valve and prevent entry of casting material from said outer container into said inner chamber and also to force molten casting material already in the inner chamber upwardly through said second valve's stem and nozzle-like body portions into said mold cavity and thereby fill same from the bottom.

SAMUEL LIPSON.
HYMAN ROSENTHAL.
HAROLD MARKUS.

REFERENCES CITED

The following references are of record in the file of this patent:

UNITED STATES PATENTS

| Number | Name | Date |
| --- | --- | --- |
| 1,029,565 | Wetherill et al. | June 11, 1912 |
| 1,912,981 | Hoy | June 6, 1933 |
| 1,950,864 | Schultz | Mar. 13, 1934 |
| 1,999,961 | Daesen et al. | Apr. 30, 1935 |
| 2,210,544 | Galloway | Aug. 6, 1940 |